G. RESSLER
POLYPOINTED PENCIL CASE.
APPLICATION FILED JULY 25, 1914.
1,170,671.
Patented Feb. 8, 1916.
3 SHEETS—SHEET 1.
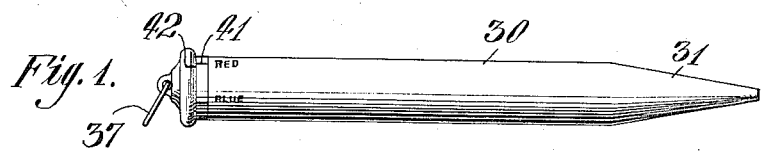
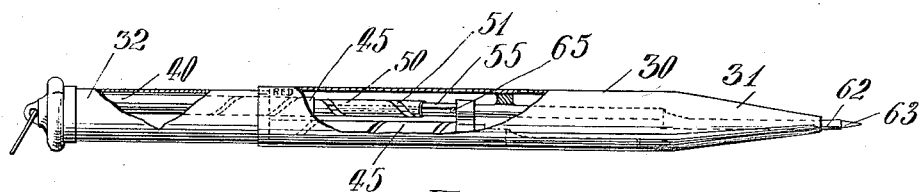
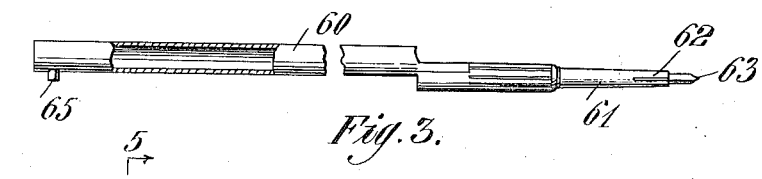
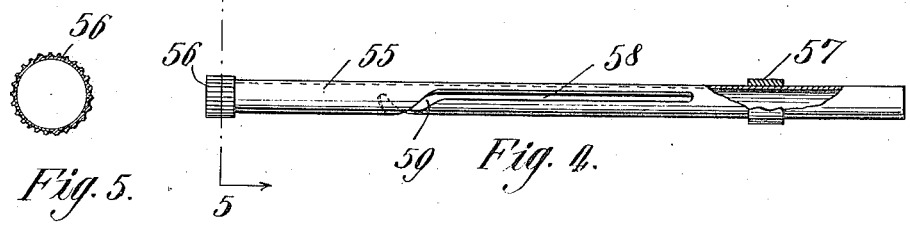
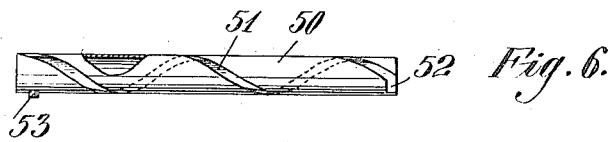
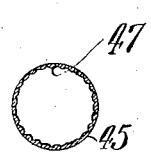
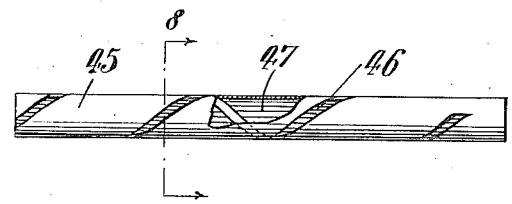
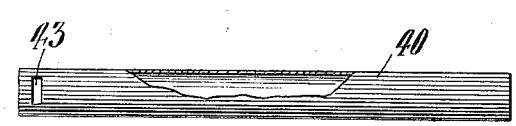
Witnesses:
Fred Roeger
Warren E. Willis
Inventor
George Ressler G. RESSLER
POLYPOINTED PENCIL CASE.
APPLICATION FILED JULY 25, 1914.
1,170,671.
Patented Feb. 8, 1916.
3 SHEETS—SHEET 2.
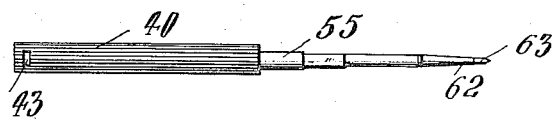
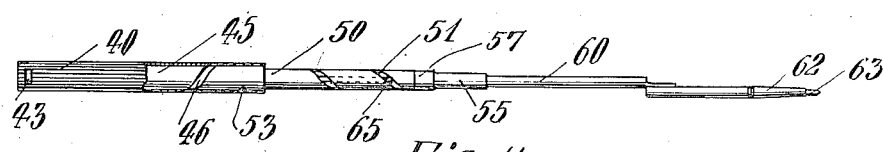
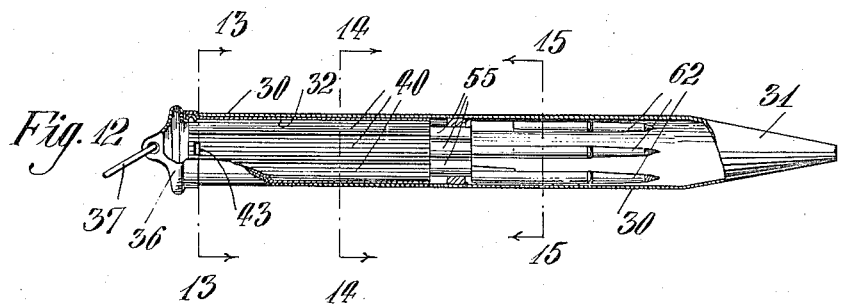
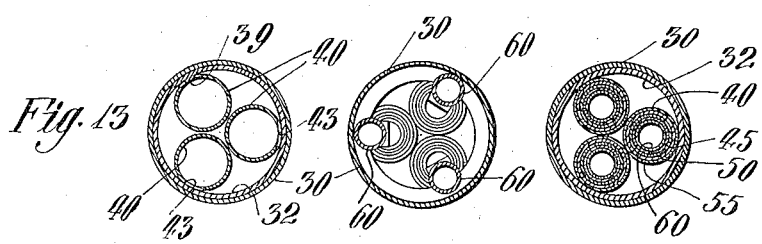
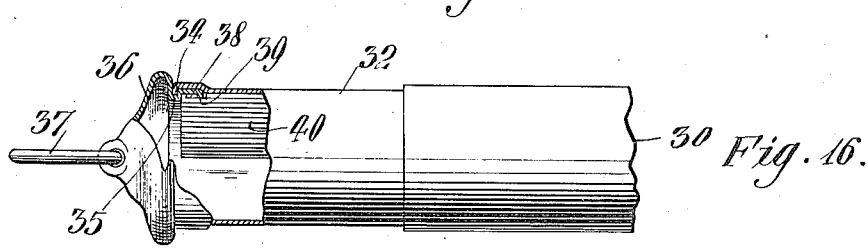
Witnesses:
Inventor
George Ressler

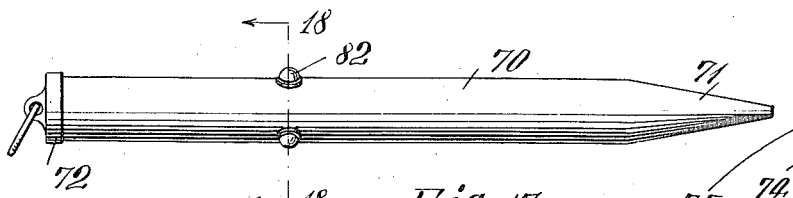
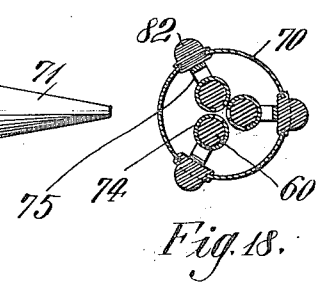
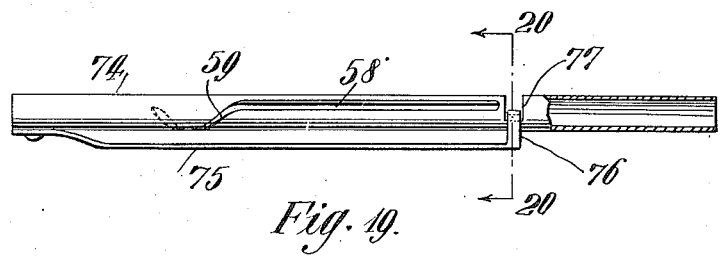
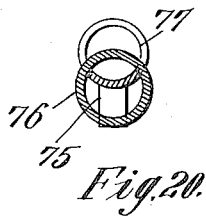
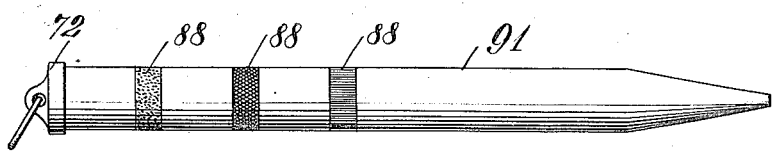
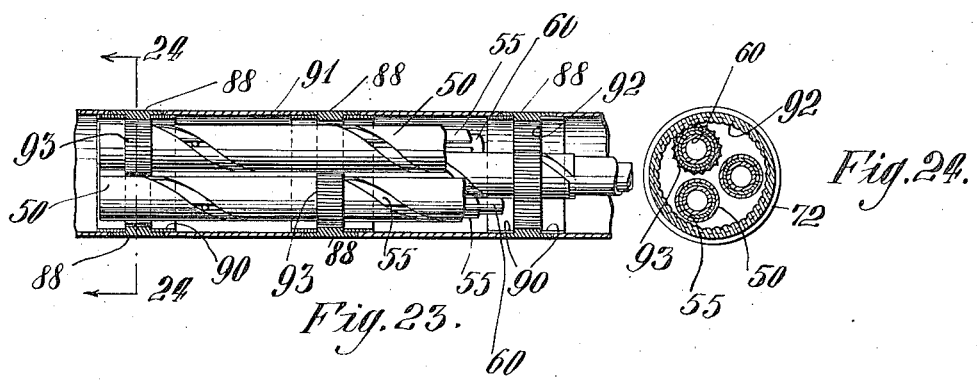

UNITED STATES PATENT OFFICE.

GEORGE RESSLER, OF NEW YORK, N. Y.

POLYPOINTED PENCIL-CASE.

1,170,671.

Specification of Letters Patent.

Patented Feb. 8, 1916.

Application filed July 25, 1914. Serial No. 853,150.

*To all whom it may concern:*

Be it known that I, GEORGE RESSLER, a citizen of the United States, and a resident of New York, in the county of New York and State of New York, have invented certain new and useful Improvements in Polypointed Pencil-Cases, of which the following is a specification.

This invention relates to improvements in pencil cases and has particular reference to pencil cases containing a plurality of selectively operable points.

The objects are, first, to provide a case capable of containing a plurality of pencil holding devices, each being independently and selectively ejectable, therefore affording a variety of colors or degrees of hardness within a single receptacle of ordinary size. Second, to provide means combined with the case whereby each separate point is held rigidly central or axial of the case when in an extended position, and, third, to provide means whereby the ejection or retraction of the several points may be effected without interference with others. These and other objects are accomplished by the novel construction and arrangement of parts hereinafter described and shown in the accompanying drawings, forming part of this specification, and in which:

Figure 1 is a side view of a pencil embodying the improvements, shown in a closed condition. Fig. 2 is a similar view of the same, showing the pencil operatively extended. Fig. 3 is a detail side view of the point engaging element. Fig. 4 is a similar view of the conducting tube. Fig. 5 is an enlarged cross sectional view, taken on line 5—5 of Fig. 4. Fig. 6 is a detail side view of a helical inner sleeve. Fig. 7 is a like view of a helical outer sleeve. Fig. 8 is an enlarged cross sectional view, taken on line 8—8 of Fig. 7. Fig. 9 is a detail side view of the outer sheath. Fig. 10 is a side view, showing the elements constituting a single point holder assembled and in a closed position. Fig. 11 is a similar view of the same, but showing the elements extended. Fig. 12 is a side view of the several point elements assembled in a case, partially broken away, showing the interior. Fig. 13 is a transverse sectional view taken on line 13—13 of Fig. 12, enlarged in scale. Fig. 14 is a similar sectional view taken on line 14—14 of Fig. 12 enlarged in scale. Fig. 15 is another like view taken on line 15—15 of Fig. 12, also enlarged in scale. Fig. 16 is a partial side elevation and section of the casing top, showing the arrangement of parts therein, drawn to an enlarged scale. Fig. 17 is a side view showing a modified form of construction. Fig. 18 is a magnified cross sectional view taken on line 18—18 of Fig. 17. Fig. 19 is a detailed side view and section of the sleeve as used in the modified form. Fig. 20 is an enlarged cross sectional view taken on line 20—20 of Fig. 19. Fig. 21 is an enlarged side view of the point holder, and attachment used in the modified construction. Fig. 22 is a side view of a pencil case indicating a second modification. Fig. 23 is a partial enlarged longitudinal sectional view of the same, and, Fig. 24 is a transverse sectional view of the same, taken on line 24—24 of Fig. 23.

In the pencils in the drawings, there are three of the lead carriers, although it will be understood that any convenient number may be used. These are arranged parallel with each other, in contact, equidistant from a common axis and preferably secured together.

The invention includes an exterior cylindrical shell or casing 30 having a rigidly attached hollow conical tip 31 through which the point extends when in position for use. Within the shell 30 is fitted a sliding extensible sleeve 32, expanded at the outer end 33, to the same diameter as the shell and formed with an internal circumferential flange 34 engaging with an annular recess 35 formed in the cap 36, holding the latter securely but rotatably on the casing. The cap is provided with the ring 37 used to attach the pencil case to a chain or like securing means.

Inside of the cap a single narrow finger 38 is formed terminating in an inturned projection 39 adapted to intersect and engage in the slot 43 formed near the outer end of the sheaths 40 which act as outer casings for each individual pencil mechanism contained in the pencil case. Thus its construction permits the cap to be turned with relation to the shell and by means of it, the sleeve 32 may be withdrawn in whatever position it may be; when it is desired to eject a pencil point, the projection 39 is brought into engagement with the slot 43, the position being ascertained by means of suitable marks 41, engraved on the sleeve, and a single mark 42 on the cap. When these marks coincide, the respective pencil mechanism becomes operative.

As each pencil mechanism in the case is of like construction, one only will be described. Rotatable within the sleeve 32, and carried by the sheath 40 in such manner as to move with it, is an outer tube 45 in which a helical slot 46 is cut through the walls of the material to a point near its opposite end, the slot being left handed and the interior of the tube corrugated as shown at 47. Slidable within the tube 45 is another tube 50 having a helical slot 51 cut out right handed, its entire length, and terminating in a transverse recess 52 formed at one end, the purpose of which will be hereinafter explained. Near the opposite end is a pin 53 traversable in the slot 46 whereby the tube 50 is caused to rotate as it is passed through the tube 45, by reason of the pin engagement.

The conducting tube 55 is provided with an enlarged serrated head 56 suited to the corrugations 47 so as to move freely longitudinally therein; a band 57 is secured near the opposite end, the same being so spaced from the head 56 as to receive the tube 50; also in this portion is cut a straight slot 58 terminating at the end toward the head in a helical slot 59 which extends ninety degrees therearound. This conducting tube slidably contains the shank 60 of the offset pencil point holder 61, the front end of which is bored and split as at 62 to receive and retain the marking point or lead 63. Near the back end of the shank is a rigidly inserted pin 65 extending outward sufficiently to engage in the slots 58 and 59 of the conducting tube 55 and, passing beyond, also traverse the slot 51 in the tube 50. Thus each pencil operating mechanism may be retracted or closed, as shown in Fig. 10, by pressing the cap or cover 36 toward the tip, or, by a reverse action, the pencil is extended as shown in Fig. 11; when in the latter position, the pin 65 will have passed out of the helical slot 51 into the recess 52, holding the pencil extended against pressure exerted at its point.

In operation, when the cap 36 has been turned to register with the mark corresponding with the pencil point it is desired to eject, it is drawn outward carrying with it the sleeve 40 and tube 45; movement of the latter causes a rotary movement of the tube 50 by reason of the pin 53 engaging in the slot 46; this rotary movement also causes the tube 50 to slide longitudinally and carry with it the conducting tube 55 which is prevented from rotating by the serrated head 56 engaging in the correspondingly internal grooves or corrugations 47 of the tube 45. This sliding action is transmitted to the pencil holder, by reason of pin engagement, causing it to partially rotate, bringing the pencil point central and in register with the open end of the conical tip 37 and then advance straight out. A reverse action returns the pencil point inwardly, the final helical slot 51 turning the offset point to one side of the main casing out of the way of others when operated.

In the modification shown in Figs. 17 to 21, a somewhat simpler form is shown, operable by gravity. In this the pencil case 70 is similarly formed with a conical tip 71 and rigidly affixed cap 72. In it are tubular members 74 having attached at one end spring arms 75, carrying at their free ends rings 76 passing through an opening 77 in the tubular members 74, which latter are formed with a straight slot 58 terminating in a helix 59 extending to the opposite side of the tubular member, which is adapted to freely receive the shank 60 of the offset pencil holder; the shank is formed with reduced diametral portions 80 and 81, for holding the pencil in either a retracted or extended position by reason of engagement with the spring mounted ring 76, the latter being operatively actuated by pressure applied to the corresponding push knob 82, which extends slightly beyond the walls of the outer casing. The operation of this style is readily effected by applying pressure to the selected knob, corresponding to the pencil point it is desired to expel and holding the point downward allowing the pencil holder to drop by gravity into operative position, then releasing the knob, whereupon the spring will cause the ring to engage with the reduced shank at 81, holding it securely in position; obviously a reversal of the pencil case, accompanied by pressure on the knob, causes the point to recede into the case, the pencil point holder being there retained in the manner before described.

The third and last modification, shown in Figs. 22 to 24, exhibits most of the structural features hitherto explained but operates in a positive manner by revolving the knurled rings 88 secured to bands 90 set in the surface of the pencil case 91, and by toothed connections 92 engage with rings 93 secured to the helically slotted tubes containing the pencil mechanisms causing them to rotate and expel or retract the point as in the first described mechanism.

Having thus described my invention and the method of its operation, what I claim as new and desire to secure by Letters Patent, is:

1. A pencil case comprising a magazine, a sleeve movable therein, a cap rotatably engaging said sleeve, a plurality of marking point carriers operable in said sleeve, a propelling sleeve for each marking point carrier, and means combined with said cap engaging with any one of said propelling sleeves whereby any selected marking point carrier may be propelled outwardly upon the sliding movement of the propelling sleeve.

2. A pencil case comprising a magazine, a sleeve telescopically contained in said magazine, a revoluble cap engaging said sleeve, a plurality of marking point carriers each having an offset portion operable in said sleeve, means combined with said cap for propelling any of said point carriers, and means whereby said point carriers are caused to partially rotate during their longitudinal movement, thereby bringing the offset portion into a central position with respect to said magazine while being propelled therethrough.

3. A pencil case comprising a magazine, a plurality of marking point carriers therein, a sleeve telescopically engaged in said magazine, a rotatable cap engaging said sleeve, means combined with said cap for ejecting and retracting any point carrier selected by rotation of the cap upon movement of the sleeve within the magazine, and means for causing the pencil points to be operatively exposed axially of said magazine.

4. In a pencil case, the combination with a magazine and a plurality of marking point carriers therein, each having a cylindrical portion and an offset portion formed with the cylindrical portion, means for selectively rotating any one of said carriers to move the offset portion to a position centrally of the magazine and to propel said carrier outwardly of the casing.

5. In a pencil case, the combination with a plurality of marking point carriers, each having a cylindrical portion and an offset portion formed therewith, of a pin set in the cylindrical portion, a sheath enveloping said cylindrical portion, said sheath having an open slot curved a portion of its length and straight the remainder, receptive of said pin, whereby said off-set portion is moved into and out of a central position relative to said sheath, means for ejecting and retracting any of said point carriers.

6. In a pencil case, the combination with a plurality of independently operable units, each comprising a sleeve, telescopic guide tubes provided with helical slots slidable in said sleeve, a slotted sheath rotatable therewithin, a marking point carrier slidable within said sheath, a pin combined with said carrier engageable with the slot in said sheath and with the slot in one of said tubes, the slot in said sheath being so formed as to cause said carrier to turn through a half revolution and then advance in a straight line.

7. In a pencil case, the combination with a magazine barrel, a sleeve slidable therein and a plurality of telescopic point propelling tubes, the outer tube being notched at one end, of a cap rotatably combined with said sleeve, a hook formed with said cap adapted to engage with the notch in any selected outer tube whereby it may be moved longitudinally, a plurality of offset point holders, stems attached thereto, sheaths enveloping said stems, said sheaths having a slot passing helically half around their circumference, thence continuing straight toward the point, pins set in said stems operable in said slot, means combined with one of said telescopic tubes whereby its associated point holder may be held rigidly when in an extended position and means operable through said cap for extending and retracting said point holders.

8. A pencil case comprising a magazine, a plurality of marking point carriers therein, separate means for propelling each of said carriers outwardly, a sleeve slidable in the magazine, a cap rotatably carried by the sleeve, coöperating elements to cause the sleeve to selectively engage any one of the propelling means, said propelling means so engaged being operated to propel the carrier outwardly upon the sliding movement of the sleeve.

In testimony whereof I have signed my name to this specification in the presence of two subscribing witnesses.

GEORGE RESSLER.

Witnesses:
 WARREN E. WILLIS,
 HANS C. BOOS.